United States Patent [19]
Bonis

[11] Patent Number: 5,272,858
[45] Date of Patent: Dec. 28, 1993

[54] ATTACHMENT FOR LEAF BLOWERS

[76] Inventor: James E. Bonis, 4 Taylor Ave., Norwalk, Conn. 06854

[21] Appl. No.: 832,809

[22] Filed: Feb. 4, 1992

[51] Int. Cl.⁵ .......................................... A01D 75/00
[52] U.S. Cl. ...................... 56/12.8; 56/16.7; 56/400.04; 56/DIG. 8; 15/340.2
[58] Field of Search .................. 56/16.7, 16.4, 12.8, 56/DIG. 8, 400.01, 400.02, 400.03, 400.04; 15/340.1, 340.2, 340.3, 340.4

[56] References Cited

U.S. PATENT DOCUMENTS

| | | | |
|---|---|---|---|
| 3,205,643 | 9/1965 | Dunham | 56/400.02 |
| 3,568,422 | 3/1971 | Thies | 56/DIG. 8 X |
| 3,710,412 | 1/1973 | Hollowell | 15/340.1 X |
| 5,119,619 | 6/1992 | Zappia | 56/16.7 X |

Primary Examiner—Terry Lee Melius
Attorney, Agent, or Firm—Handal & Morotsky

[57] ABSTRACT

A ruffling attachment is disclosed for a blower for blowing leaves and other debris on the ground in a desired direction. The blower is of the type which includes a blowing apparatus having an output blowing port which puts out an output air flow. The apparatus is supported on a rollable support. The attachment comprises a support bracket configured and dimensioned to be secured to the blower and an attachment member secured to the bracket. A branching support member comprises a base adapted to matingly attach to the attachment member and a pair of arms extending to ends positioned at opposite sides of the output air flow. A pair of rufflers is provided, each of the rufflers extending respectively from a respective end on one of the arms. Both of the rufflers extend in a generally downward direction to points on opposite sides of the output air flow and bear down against the ground upon which the blower is resting.

25 Claims, 7 Drawing Sheets

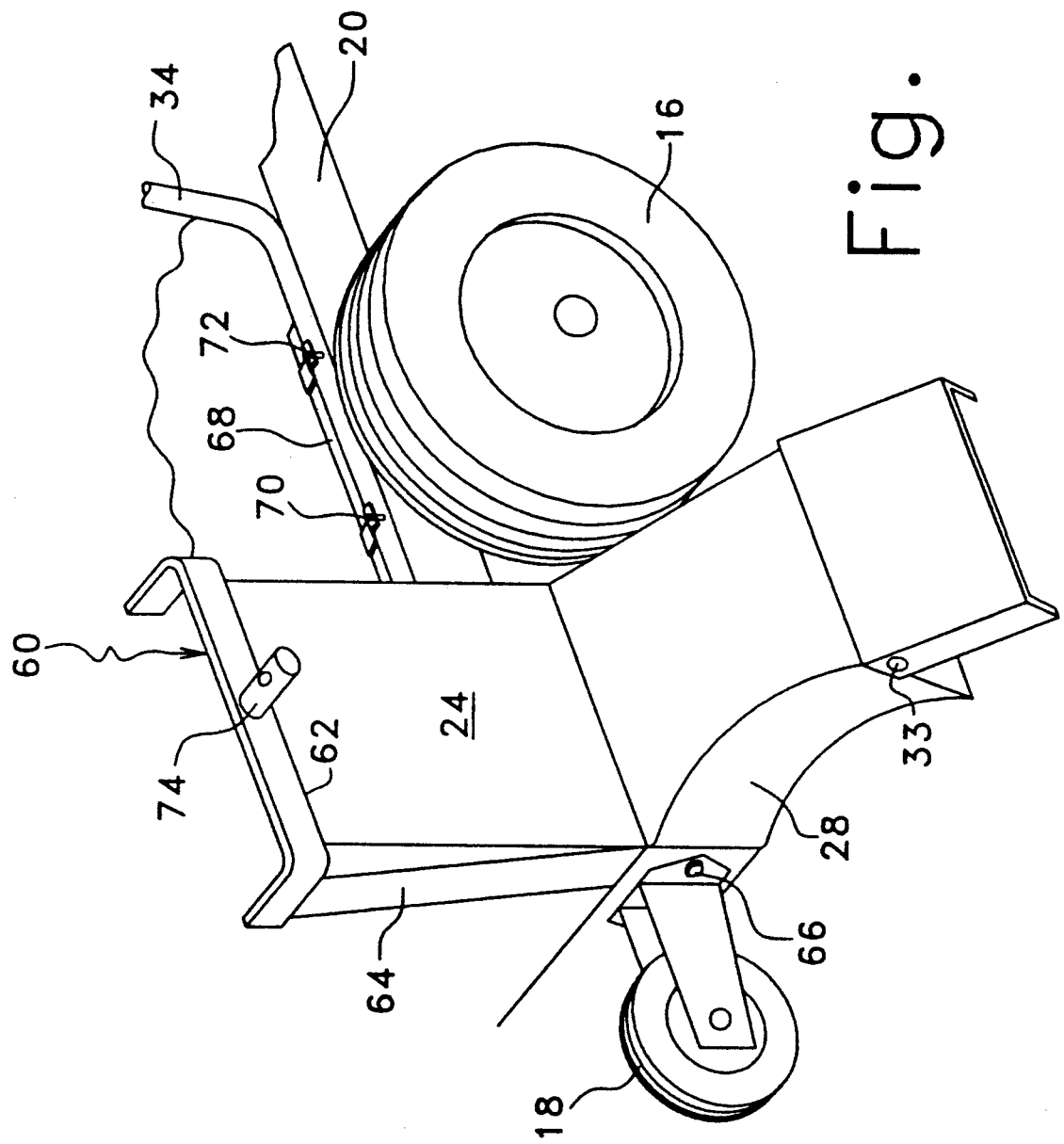

ATTACHMENT FOR LEAF BLOWERS

TECHNICAL FIELD

The present invention relates to devices for blowing leaves or other materials to a desired location for the purpose of landscape maintenance.

BACKGROUND

Recent years have seen increasing maintenance of gardens and various other types of landscapes by means of mechanized garden maintenance equipment. Such devices include power mowers, extra-wide mowers, tractor operated leaf baggers, electric hedge clippers, chain saws, powered post hole diggers, shredders, chippers, and electric bulb hole diggers.

Among the first tasks which became mechanized was the removal of unwanted material from the landscape. For example, U.S. Pat. No. 622,487 of Jones (1899) is directed to a sweeping device including four blowers and a rotary brush. Generally, this sort of device and others like it used blowers to create an air flow for the entrainment and collection of debris.

While Jonses' device is meant primarily for sweeping dirt and smaller debris from streets, the leaf collecting analog of the same is illustrated, for example, by U.S. Pat. No. 2,505,576 of Reitan (1950). Reitan's device is a power rake with a cylindrical configuration and is used to scrape leaves from the ground and toss them into a collection zarf. However, this power rake fails to use blowers to create a current of air which re-enforces the action of the rotary brush by running air in the same direction as the movement of the brush elements.

Nevertheless, other debris collection system of more recent vintage use blowing air to great advantage. These include ordinary backpack mounted leaf blowers and roller mounted leafblowers such as that disclosed in U.S. Pat. No. 1,932,137 of Jinkerson.

However, even though these devices have seen very widespread use, they are almost completely ineffective after leaves have been rained on and matted down. Under such conditions a simple blower either of the backpack or wheel mounted variety will not suffice to blow leaves to a desired place for collection.

Under such circumstances, it then becomes necessary to use a mechanical device to collect the leaves, resulting in resort to the conventional hand-held leaf rake of the type typically having a fan-shaped configuration. As an alternative, the rake may be used only to separate the compacted leaves from each other thus putting them into a volume which incorporates large air spaces. After being broken up in this manner, the leaves will become relatively easily moved by the action of a blower. Such a technique applies equally well to both blowers of the backpack and wheel mounted variety.

However, such an approach largely negates the advantages of automated air blowing.

SUMMARY OF THE INVENTION

The invention, as claimed, is intended to provide a remedy. A solution to the above problems is provided by the device of the present invention. It solves the problem of how to blow leaves which have been matted down due to such things as rain, being trampled on, or the like. At the same time, the invention provides such a solution without the added problem of sweepers sweeping up undesirable objects such as stones, metal debris or the like into the system, thus causing the possibility of serious damage to the sweeper or, more seriously, injury to the user of the equipment on account of such objects being thrown from the machine as dangerous flying shrapnel.

The same is achieved by providing a ruffling attachment for a blower for blowing leaves and other debris on the ground in a desired direction. The blower is of the type which includes a blowing apparatus having an output blowing port which puts out an output air flow. The apparatus is supported on a rollable support. The attachment comprises a support bracket configured and dimensioned to be secured to the blower and an attachment member secured to the bracket. A branching support member comprises a base adapted to matingly attach to the attachment member and a pair of arms extending to ends positioned at opposite sides of the output air flow. A pair of rufflers is provided, each of the rufflers extending respectively from a respective end on one of the arms. Both of the rufflers extend in a generally downward direction to points on opposite sides of the output air flow and bear down against the ground upon which the blower is resting.

BRIEF DESCRIPTION OF THE DRAWINGS

One way of carrying out the invention is described in detail below with reference to drawings which illustrate only one specific embodiment of the invention and in which:

FIG. 5 is a perspective view showing the attachment structure for attaching the inventive ruffler;

BEST MODE FOR CARRYING OUT THE INVENTION

Figure 1:
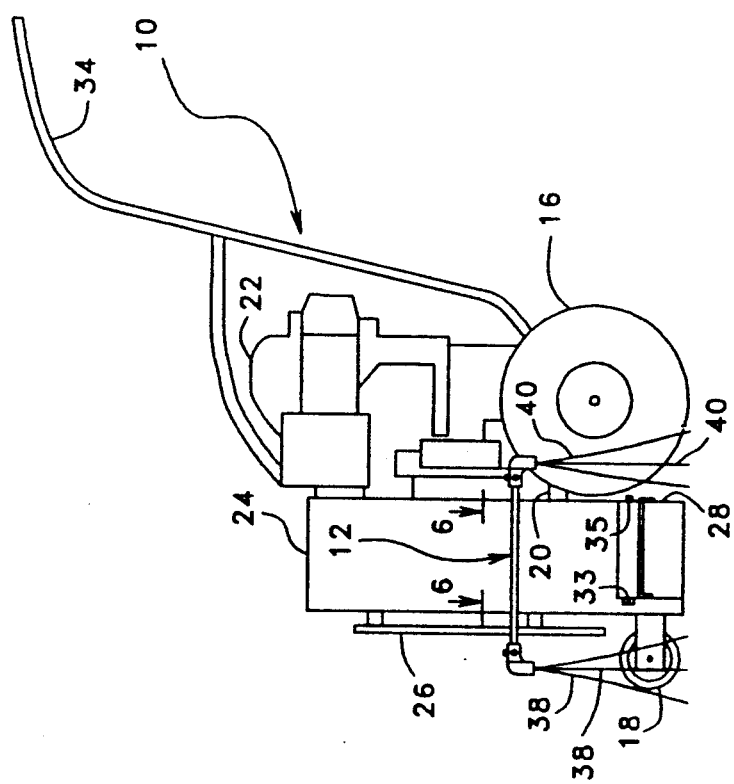
FIG. 1 is a side view of a leaf blower incorporating the inventive leaf ruffling attachment.

Referring to FIG. 1, a leaf blower 10 incorporating the inventive ruffler attachment 12 is illustrated. Generally, blower 10 includes a pair of rear wheels 14 and 16 as can be seen most clearly in FIG. 2. Front stability is provided by a small front wheel 18. Wheels 14 and 16 are mounted to a chassis 20 which also serves to support an engine 22 which may be powered with any convenient source, such as gasoline. The engine drives a blower 24 which incorporates an intake baffle 26 which prevents leaves and debris from entering the blower which is intended only to blow air.

Blower 24 blows air through a chute 28 which has an open lid 30 which helps to direct air in the direction of arrow 32. The lid 30 is rotatably mounted and held in place by a pair hex bolts 33 and 35.

Motive power is provided by pushing the blower using the handle 34 which is secured to the chassis by several hex bolts as will be detailed below. Handle 34 is supported in part by support member 36 as can be seen most clearly in FIG. 2.

Figure 2:
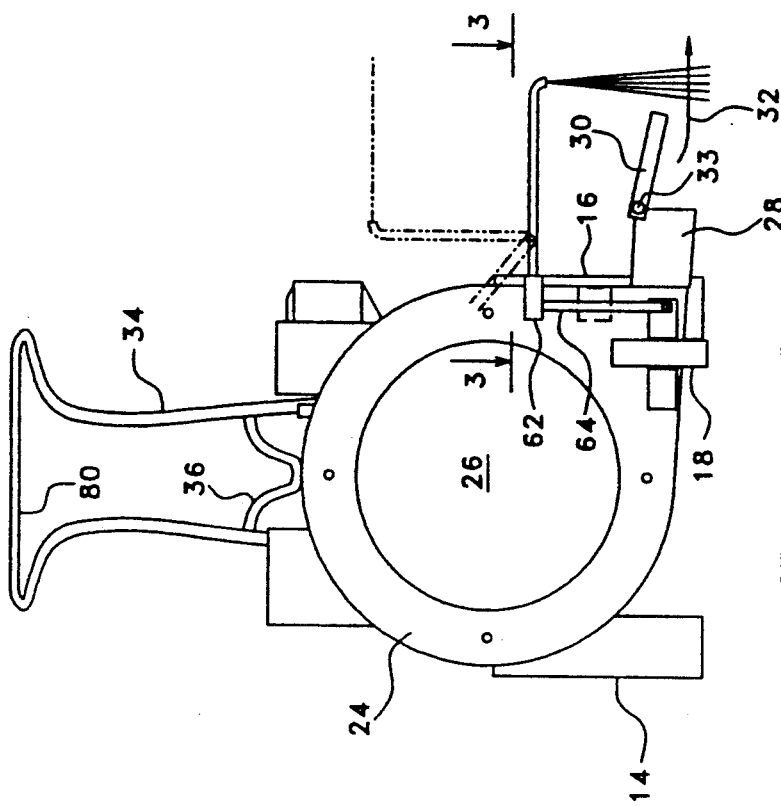
FIG. 2 is a front view of the leaf blower of FIG. 1.

As can be seen in FIGS. 1 and 2, the inventive ruffler attachment 12 comprises a pair of ruffler fingers 38 and 40 which are mounted to bear against the earth during use to provide a desired ruffling action on leaves and other compacted debris to be blown. The fingers may be flexible or stiff. The fingers are located on opposite sides of the discharge from chute 28 and are positioned a distance away from the output of the chute as illustrated in FIG. 2.

Figure 3:
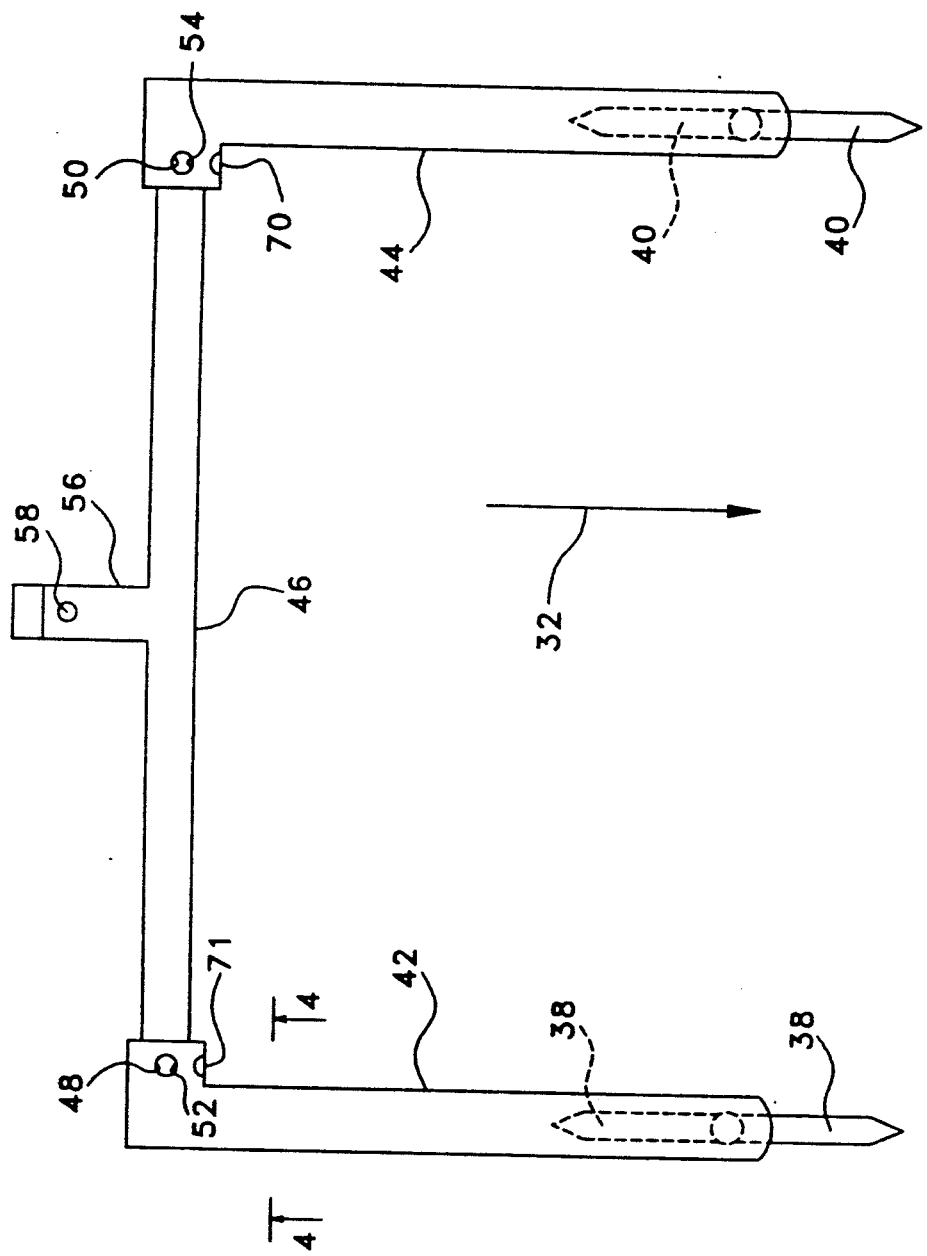
FIG. 3 is a top plan view along lines 3—3 of FIG. 2 showing only the inventive leaf ruffling attachment.
Figure 4A:
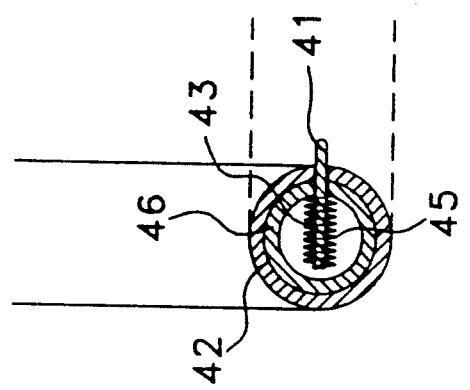
FIG. 4a is a view along lines 4a—4a of FIG. 4.
Figure 4:
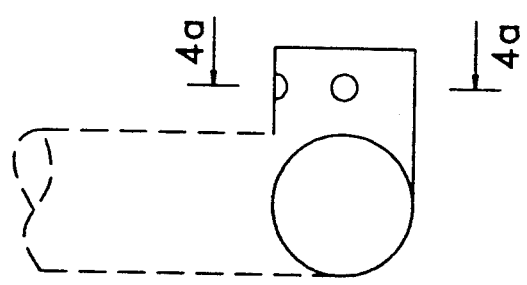
FIG. 4 is a view along lines 4—4 of FIG. 3 illustrating the rotation of the rufflers to a position where they are not in the way of the user.

As shown more clearly in FIGS. 3 and 4, one or a plurality of ruffler fingers 38 and 40 are mounted at the ends of support tubes 42 and 44. Support tubes 42 and 44 are mounted at opposite ends of separator tube 46 which includes a pair of spring loaded snap engagement studs 48 and 50 at one of each of its ends. As shown in FIG. 4a stud 48 is urged outwardly by spring 51 through hole 52 which bears against the inside of tube 42 and annular ridge 53. These studs are spring loaded studs of conventional design which mate with holes 52 and 54 in support tubes 42 and 44, respectively. Support tubes 42 and 44 fit over and matingly engage separator tube 46, and are locked into position by spring loaded studs 48 and 50.

Separator tube 46 is, in turn, mounted to central support tube 56 which also includes a spring loaded stud assembly 58 whose purpose is to engage structure which is permanently secured to the leaf blower. Such permanently secured structure 60 is illustrated most clearly in FIG. 5. Structure 60 includes a crossbar 62 which has an elongated U-shape and a straight side support 64 which terminates in a hole through which a hex bolt 66 passes, securing it to the body of the leaf blower. An L-shaped side support 68 is, in turn, secured to chassis 20 by a pair of hex bolts 70 and 72 which also perform the function of securing handle 34 to chassis 20. Finally, a tubular center support 74 is secured to the center of crossbar 62 and is configured to matingly engage central support tube 56 and its spring loaded stud-assembly 58.

Crossbar 62, L-shaped side support 68, side support 64 and tubular center support 74 are all secured to each other by welding. They are made of steel or any other rigid strong material. Ruffling fingers 38 and 40 may be made of rigid or flexible resilient material, depending upon the nature of the task to be performed.

Figure 6:
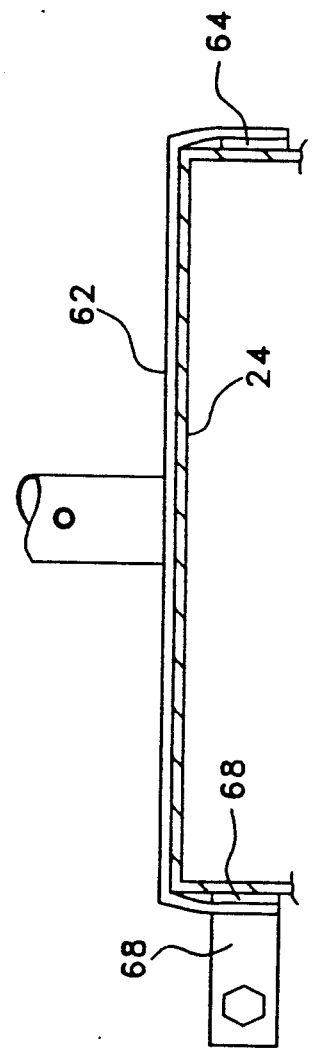
FIG. 6 is a top plan view of the mounting structure for the ruffler attachment along lines 6—6 of FIG. 1.

The construction of the inventive attachment can be seen from top plan view FIG. 6 which illustrates the relationship between side support 64, L-shaped side support 68, and crossbar 62.

As can be seen most clearly in FIG. 3, a second pair of holes 76 and 78 are provided on support tubes 42 and 44. These allow the spring loaded studs 48 and 50 to be disengaged from holes 52 and 54. When support tubes 42 and 44 are rotated upwardly as illustrated in dashed lines in FIGS. 2 and 4, support tubes 42 and 44 will have their holes 76 and 78 engaged by spring loaded studs 48 and 50 thus locking them in an upward position as illustrated in dashed lines in FIG. 2. Alternatively, by appropriate placement of holes 76 and 78 (or the provision of additional holes) displacement of the rufflers to a position even further displaced from their original position as illustrated in phantom lines in FIG. 2, may be achieved.

During use, the operator grasps the upper portion 80 of handle 34 and pushes the blower after the motor has been started, thus causing air to come from chute 28 in the direction indicated by arrow 32. This causes air to flow in direction 32 between the ruffler fingers 38 and 40, as illustrated in FIG. 3. When it is desired not to use the ruffler fingers, it merely becomes necessary to disengage spring loaded studs 48 and 50 from holes 52 and 54 and rotate the ruffler assembly to on of the positions illustrated in phantom or dashed lines in FIG. 2.

Figure 8:
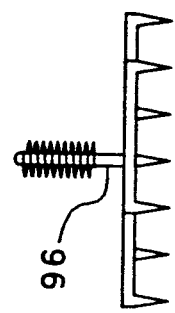
FIG. 8 is along lines 8—8, in plan, of the ruffler finger assembly of FIG. 7.
Figure 7:
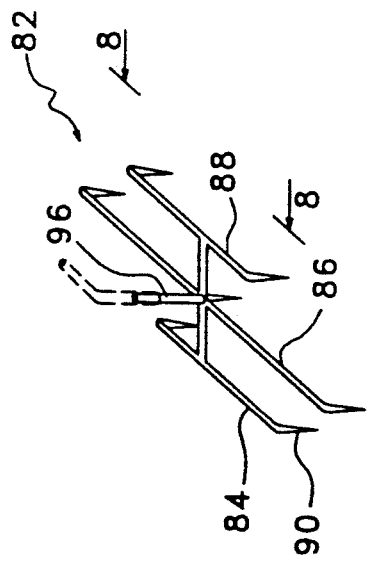
FIG. 7 is a perspective view of an alternative ruffler structure.

As an alternative to a single ruffler finger, a multiple finger design may be used. Such a ruffler assembly 82 is illustrated in FIGS. 7 and 8. While a conventional rake shape may be used, the tendency of such shape would be to accumulate leaves on one side of the device, although use of the blower with an up and down motion, resulting in a varying gap between the ruffler fingers and the ground, will tend to alleviate this problem. More particularly, the solution of the assembly of FIGS. 7 and 8 is to separate the fingers by a relatively large distance and to provide staggered ruffler sections. In particular, as illustrated in FIG. 7, three ruffler sections 84, 86 and 88 are provided. Each of the ruffler sections has a multiplicity of ruffler fingers 90 which, in the case of section 84 are positioned somewhat to the left of a central support 92. In the case of section 88 this section is positioned somewhat to the right of central support 92. Finally, in the case of section 86, the same is positioned centered on central support 92.

Figure 10:
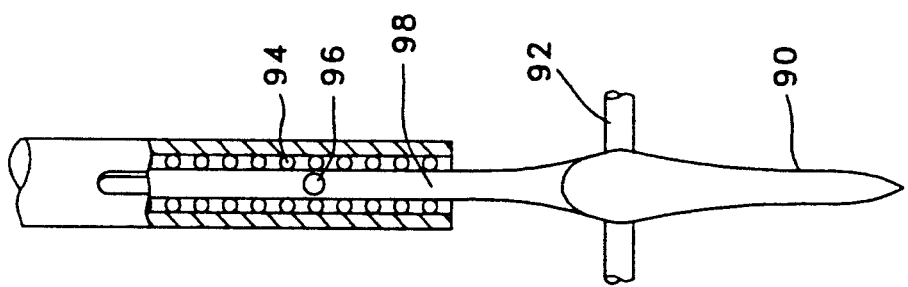
FIG. 10 is a view, partially in cross-section, of the support structure illustrated in FIG. 9.
Figure 9:
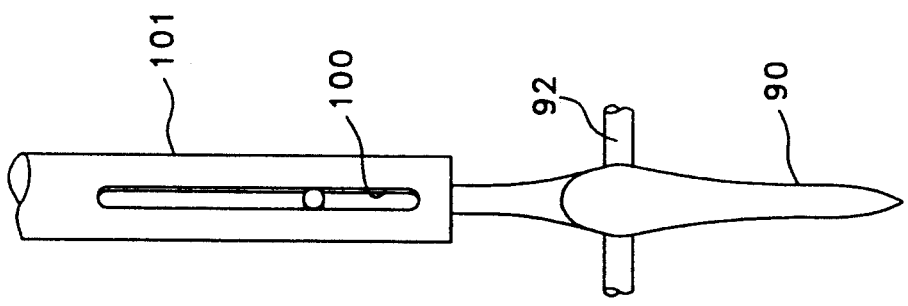
FIG. 9 is a view of a spring bias assembly in the attachment using the tool illustrated in of FIGS. 7 and 8.
Figure 12:
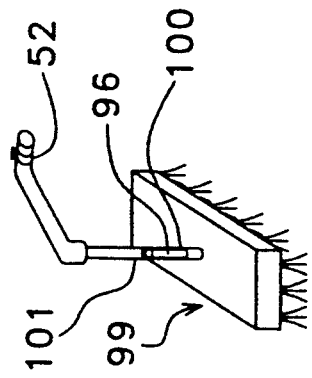
FIG. 12 is a view of a brush which may be used in place of the tool of FIG. 7.
Figure 11:
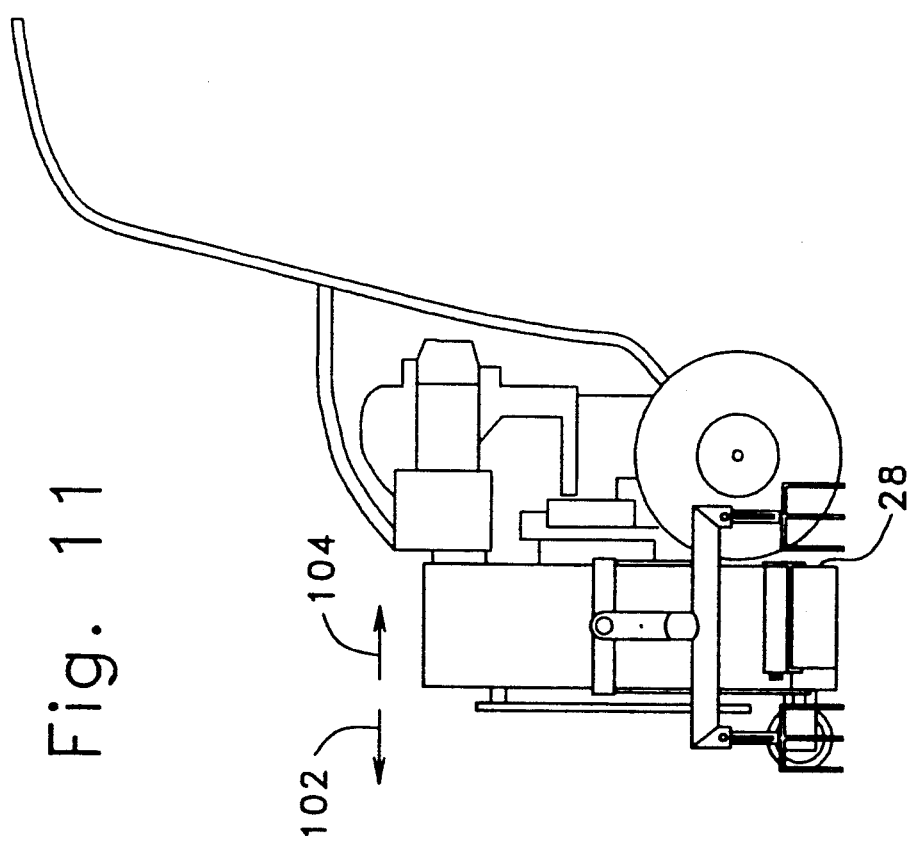
FIG. 11 is a side view of a blower with the attachment of FIG. 7.

If one desires to use relatively rigid ruffler fingers in the configuration of FIG. 7, for example, or even in the configuration of FIG. 2, a spring biased assembly may be desirable for urging the rigid fingers toward the ground. Such an assembly is illustrated in FIGS. 9 and 10. More particularly, as can be seen in FIG. 10, spring 94 is used to bias ruffler fingers 90 toward the ground by bearing against a stud 96 attached to the rod support 98 on which the ruffler assembly is mounted. The limit of the movement of the assembly is defined by the movement of stud 96 in slot 100, as illustrated in FIG. 9. Naturally, a fixed support attached to tube 101 on the other side of spring 94 is used to keep spring 94 on the bias. With respect to the operation of the assembly of the type illustrated in FIG. 7-10, reference is made to FIG. 11. It is noted that the entire assembly of rufflers must be positioned on either one side or the other of the air leaving chute 28. This insures that as the blower is moved either in the forward or backwards direction, the ruffler fingers are able to do the job of ruffling up the leaves prior to the exhaust from of chute 28 blowing over them, regardless of whether the direction of movement follows either of the directions indicated by arrow 102 or 104 in FIG. 11.

Still yet another possibility is to provide a brush 99 to ruffle small debris such as grit, paper, sand and small gravel on pavement or the like so that it may be moved by the blower.

While an illustrative embodiment of the invention has been described above, it is, of course, understood that various modifications will be apparent to those of ordinary skill in the art. For example, one can use rubber members at various joints to reduce rattling, or the members themselves may be made of plastic for the same reason. Another alternative is the use of an adjustment mechanism to vary the pressure exerted by the springs in the spring loaded ruffle members. Such modifications are, in view of the specification, within the spirit and scope of the invention, which is limited and defined only by the appended claims.

I claim:

1. A ruffling attachment for a blower for blowing leaves and other debris on the ground in a desired direction, said blower being of the type which includes a blowing apparatus having an output blowing port which puts out an output air flow, said apparatus being supported on a rollable support, said attachment comprising:
   a) a support bracket configured and dimensioned to be secured to said blower;
   b) an attachment member secured to said bracket;
   c) a branching support member comprising a base adapted to matingly attach to said attachment member and a pair of arms extending to ends positioned at opposite sides of said output air flow; and
   d) a pair of rufflers, one each of said rufflers extending respectively from a respective end on one of said arms, both of said rufflers extending in a generally downward direction to points on opposite sides of said output air flow and bearing down against the ground upon which said blower is resting.

2. A ruffling attachment according to claim 1, wherein said branching support member is mounted to said attachment member and comprises a pair of spring loaded, snap engagement studs, positioned at opposite ends of said support member, providing a mechanism for securing said arms in a desired position.

3. A ruffling attachment according to claim 1 wherein said arms are tubular, each tube comprising holes positioned for engaging said spring loaded stud.

4. A ruffling attachment according to claim 2 wherein said spring loaded stud comprises a cylindrical rod, having an annular ridge, and a spring behind said annular ridge.

5. A ruffling attachment according to claim 1 wherein said arms secure over the respective ends of said branch support member and are locked into position by the engagement of the spring loaded studs.

6. A ruffling attachment according to claim 1 wherein said attachment member comprises a spring loaded stud to secure said attachment member to a structure being permanently secured to said blower.

7. A ruffling attachment according to claim 6 wherein said structure comprises a U-shaped crossbar, a straight side support member, and an L-shaped side support member and a tubular center support member.

8. A ruffling attachment according to claim 7 wherein said straight side support member terminates in a hole through which a hex bolt passes, thereby securing said straight support member to said blower.

9. A ruffling attachment according to claim 7 wherein said L-shaped side support member is secured to the chassis of said blower by at least one hex bolt which also secures a handle to said blower.

10. A ruffling attachment according to claim 7, wherein said tubular center support member defines a hole configured to engage said spring loaded stud of said member, to secure the tubular center support member to said attachment member.

11. A ruffling attachment according to claim 2 wherein said arms may be rotated upwardly by disengaging one of said holes on said arm from the spring loaded stud of said branch support member and engaging another hole on said arm.

12. A ruffling attachment according to claim 1 wherein said ruffler is attached permanently or by spring mounting to the end of said arm.

13. A ruffling attachment according to claim 1, wherein said ruffler may be rigid or flexible.

14. A ruffling attachment for a blower for blowing leaves and other debris on the ground in a desired direction, said blower being of the type which includes a blowing apparatus having an output blowing port which puts out an output air flow, said apparatus being supported on a rollable support, said attachment comprising:
   a) a support bracket configured and dimensioned to be secured to said blower;
   b) an attachment member secured to said bracket;
   c) a branching support member attached to said attachment member and a pair of arms extending to ends positioned at opposite sides of said output air flow; and
   d) a pair of ruffler sections, one each of said ruffler sections extending respectively from a respective end on one of said arms, both of said ruffler sections extending in a generally downward direction at a first position to points on opposite sides of said output air flow and bearing down against the ground upon which said blower is resting, said branching support member having a joint which permits said ruffler to be displaced to a second position, said second position being closer to said blower than said first position.

15. A ruffling attachment according to claim 1 wherein each of said rufflers comprise a ruffler section comprising a plurality of widely spaced fingers.

16. A ruffling attachment to claim 15 wherein additional ruffler may be added to said ruffling attachment.

17. A ruffling attachment according to claim 14 wherein said fingers may be rigid or flexible.

18. A ruffling attachment according to claim 17 wherein a spring mounted assembly secures said rigid fingers to said arm and urges said fingers toward the ground 19. A ruffling attachment according to claim 18 wherein said spring mounted assembly comprises a tube, a spring, a back support in said tube and secured to said tube, and a stud on a rod support member.

20. A ruffling attachment according to claim 18 wherein said ruffler comprises a brush, resilient wire, or a rake-like member.

21. A ruffling attachment for a blower for blowing in a desired direction, leaves and other such blowable debris lying on the ground, said blower being of the type which includes a blowing apparatus having a blowing port which discharges an output air flow and being operated with a direction of travel across said ground, said blowing port being positioned proximate the ground and directing said air flow away form said blowing apparatus, said attachment comprising:
   a) a support structure configured and dimensioned to be mounted on said blower proximate said blowing port;
   b) a ruffler secured to said support structure, said ruffler including at least one debris-engagement member supported in relation to said air flow to engage and ruffle said blowable debris; whereby movement of said blower in said direction of travel causes said debris-engagement member to dislodge said blowable debris, for blowing in said desired direction by said air flow.

22. A ruffling attachment according to claim 21 for a blower of the type supported on a rollable support having a forward direction of movement and an air flow direction transverse to said forward direction wherein said ruffler is configured and disposed to dislodge blowable debris at a location forwardly of said air flow, when attached to said blower such that forward movement of said blower directs said air flow at said dislodged debris.

23. A ruffling attachment according to claim 22 wherein said ruffler is configured and disposed to dislodge blowable debris in a direction toward said air flow from said location forwardly of said air flow.

24. A ruffling attachment according to claim 21 for a blower of the type supported on a rollable support having a forward direction of movement and an air flow direction transverse to said forward direction, said ruffler being configured and disposed to dislodge blowable debris at a location positioned in said air flow, when attached to said blower.

25. A ruffling attachment according to claim 21 comprising a pair of rufflers disposable on opposite sides of said air flow.

* * * * *